US010493954B2

(12) United States Patent
Björkengren

(10) Patent No.: US 10,493,954 B2
(45) Date of Patent: Dec. 3, 2019

(54) ARRANGEMENT FOR UNLOCKING A VEHICLE, METHOD AND A VEHICLE

(71) Applicant: Volvo Car Corporation, Göteborg (SE)

(72) Inventor: Ulf Björkengren, Bjarred (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 16/298,430

(22) Filed: Mar. 11, 2019

(65) Prior Publication Data

US 2019/0315311 A1    Oct. 17, 2019

(30) Foreign Application Priority Data

Apr. 13, 2018   (EP) .................................... 18167138

(51) Int. Cl.
  *B60R 25/24* (2013.01)
  *B60S 5/02* (2006.01)
  (Continued)

(52) U.S. Cl.
  CPC .............. *B60R 25/24* (2013.01); *B60K 15/05* (2013.01); *B60R 25/01* (2013.01); *B60S 5/02* (2013.01);
  (Continued)

(58) Field of Classification Search
  CPC ......... B60R 25/24; B60R 25/01; B60K 15/05; B60S 5/02
  See application file for complete search history.

(56) References Cited

U.S. PATENT DOCUMENTS 8,798,809 B2 *  8/2014  Kalhous ............. G07C 9/00309
                                                  701/2
9,544,853 B1    1/2017  Gu et al.
(Continued)

FOREIGN PATENT DOCUMENTS

DE    102012004000 A1    8/2013
FR        3032472 A1    8/2016
(Continued)

OTHER PUBLICATIONS

Oct. 9, 2018 European Search Report issue on International Application No. EP18167138.

*Primary Examiner* — Nabil H Syed
(74) *Attorney, Agent, or Firm* — Clements Bernard Walker; Christopher L. Bernard

(57) ABSTRACT

An arrangement for unlocking a vehicle with a user equipment, including an electronic information reader module for reading authenticity information from a passive tag of the user equipment, said passive tag being powered by inducing a voltage therein, wherein the arrangement is configured for running a first authentication protocol via the reader module and the passive tag, a charging device for charging the user equipment, wherein the charging device is located in a closeable space of the vehicle being closeable by at least one lockable lid, wherein the at least one lockable lid is configured to be unlocked when the reader module and the passive tag are in communicative contact and when the arrangement has verified an authenticity of the passive tag, and wherein the arrangement is configured to run an additional authentication protocol with the user equipment for unlocking at least one door of the vehicle.

15 Claims, 2 Drawing Sheets

(51) Int. Cl.
*B60K 15/05* (2006.01)
*B60R 25/01* (2013.01)

(52) U.S. Cl.
CPC . *B60K 2015/0561* (2013.01); *B60R 2325/103* (2013.01); *B60R 2325/105* (2013.01); *B60R 2325/205* (2013.01)

(56) References Cited

U.S. PATENT DOCUMENTS

| | | |
|---|---|---|
| 2010/0075655 A1 | 3/2010 | Howarter et al. |
| 2014/0058586 A1 | 2/2014 | Kalhous et al. |
| 2014/0165676 A1* | 6/2014 | Inoue ............... B60L 53/65 70/256 |
| 2014/0316612 A1 | 10/2014 | Banter et al. |
| 2016/0118839 A1* | 4/2016 | Lee .................. H02J 50/80 320/108 |
| 2016/0358396 A1 | 12/2016 | Spiess et al. |
| 2017/0089104 A1 | 3/2017 | Kowaleski et al. |
| 2018/0351388 A1* | 12/2018 | Orris ................ H02J 7/025 |

FOREIGN PATENT DOCUMENTS

| | | |
|---|---|---|
| GB | 2496847 A | 5/2013 |
| KR | 101667990 B1 | 10/2016 |
| WO | 9511498 A1 | 4/1995 |

\* cited by examiner

ARRANGEMENT FOR UNLOCKING A VEHICLE, METHOD AND A VEHICLE

CROSS-REFERENCE TO RELATED APPLICATION

The present patent application/patent claims the benefit of priority of co-pending European Patent Application No. 18167138.9, filed on Apr. 13, 2018, and entitled "ARRANGEMENT FOR UNLOCKING A VEHICLE, METHOD AND A VEHICLE," the contents of which are incorporated in full by reference herein.

TECHNICAL FIELD

The present disclosure relates to an arrangement for unlocking a vehicle with a user equipment, to a corresponding method and to a vehicle including the arrangement.

BACKGROUND

Vehicles, such as passenger cars, usually require a key or a key fob for unlocking the vehicle's doors and for activating the vehicle, e.g. starting the engine. As is well known, such a key may be an electronic remote control key, which unlocks the passenger doors once a user pushes on a key button. It is also known to make use of keyless entry systems for vehicles. With such systems, a vehicle door may for example be unlocked once a user touches a handgrip of the door and also keeps an electronic verification key in the proximity of the door. In the event the electronic key runs out of power, it may further include a physical key for unlocking the vehicle.

Recently, it has also been more common to incorporate a vehicle unlocking function into other devices, such as into smartphones. Thereby, by using for example a so called app (mobile application software) in the smartphone, vehicle doors may be unlocked by running an authentication protocol between the smartphone and the vehicle. However, incorporating physical keys into smartphones for unlocking when the smartphone has no power is not a suitable solution.

Another example of how a vehicle passenger compartment may be unlocked and accessible to a user is to make use of Near Field Communication (NFC) technology. For example, US patent application no. 2016/0358396 A1 discloses to incorporate a passive NFC tag into a mobile device, wherein the passive tag can be used for unlocking a vehicle door or starting the vehicle when for instance the mobile device has run out of battery or is turned off.

SUMMARY

In view of the above, an object of the present invention is to provide an improved arrangement for unlocking a vehicle with a user equipment and an improved method for unlocking a vehicle with a user equipment. More particularly, an object of the present invention is to provide an arrangement for a vehicle and a corresponding method which facilitates unlocking of the vehicle and which also is secure and mitigates the risk that someone unlawfully enters the vehicle.

According to a first aspect, the object is provided by an arrangement for unlocking a vehicle with a user equipment, which includes an electronic information reader module for reading authenticity information from a passive tag of the user equipment, the passive tag being powered by inducing a voltage therein, wherein the arrangement is configured for running a first authentication protocol via the reader module and the passive tag, a charging device for charging the user equipment, wherein the charging device is located in a closeable space of the vehicle being closeable by at least one lockable lid, wherein the at least one lockable lid is configured to be unlocked when the reader module and the passive tag are in communicative contact and when the arrangement has run the first authentication protocol and verified an authenticity of the passive tag based on the authenticity information, and wherein the arrangement is configured to run an additional authentication protocol with the user equipment for unlocking at least one door of the vehicle.

It has been realized by the inventor that when a user equipment, such as a smartphone, has become powerless or is turned off, using a passive tag for unlocking a vehicle door may be convenient but on the other hand results in a less secure solution. More particularly, security information in a passive tag (such as an NFC tag or the like) for unlocking may be easy to copy and thereby the risk of theft increases. Hence, the inventor has realized that providing a charging device in a closeable space of a vehicle, which space is closed by a lockable lid and openable by using a passive tag in the user equipment provides a convenient and secure solution for unlocking the vehicle. Hence, a less secure passive tag/reader configuration can be used for accessing the charging device, and when the charging device has charged the user equipment to a certain level, an additional authentication protocol, which may be more secure, can be used for unlocking the vehicle to thereby access the vehicle compartment. Thereby, it will be possible to unlock the vehicle in a secure and convenient manner even if the user equipment has run out of power.

Optionally, the passive tag may be powered by inducing a voltage therein by the electronic reader module. A passive tag, as used herein, may be defined as an electronic device that includes electronically stored information (data) and which is powered and activated by electromagnetically inducing a voltage in the tag by another separate electronic device. When the tag is activated it may be configured to transmit, such as by radio frequency (RF) transmission, the electronic information which may be received by a compatible reader module. The passive tag may include an antenna and an internal chip.

Optionally, the reader module may be configured to verify an authenticity of the passive tag based on the authenticity information. Still optionally, the arrangement may further include at least one processing unit for verifying an authenticity of the passive tag based on the authenticity information received from the passive tag via the reader module.

Optionally, the additional authentication protocol for unlocking the at least one door may be configured to be run via the charging device. Thereby, once the user equipment has been connected to the charging device and charged to a level allowing it to be activated, the additional authentication protocol may be run via the charging device. This may be convenient for the user since charging and the additional authentication may be done in one operation.

Optionally, the charging device may include at least one of a physical charging connection, such as a Universal Serial Bus (USB) connection, or an inductive charging connection. A physical connection may thus in one example embodiment be an electronic connection which is configured to power/charge the user equipment and to transfer information (such as security information) between the arrangement and the user equipment.

Optionally, the additional authentication protocol may be configured to be run via at least one of a physical electrical connection and a wireless connection between the arrangement and the user equipment.

Optionally, the lockable lid may be a fueling and/or electrical charging lid of the vehicle. As most vehicles are equipped with a fueling lid and/or electrical charging lid, it may be a convenient solution to provide the charging device in such a closed space of the vehicle, thereby also avoiding providing additional closeable spaces.

Optionally, the user equipment may be any one of a mobile device, a smartphone, a tablet computer, any kind of wearable electronic device, such as a watch, or any other similar electronic user equipment. Still optionally, the user equipment may include a processing unit (e.g. a central processing unit, CPU) and a memory unit (e.g. a solid state drive, SSD) which are configured for running the additional authentication protocol once being activated.

Optionally, the reader module and the passive tag may be adapted to be in communicative contact in a range of 2, 1, 0.5, 0.4, 0.3, 0.2 or 0.1 meters or less from each other. Still optionally, the reader module and the passive tag may be configured as an NFC reader/tag and/or a Radio-Frequency Identification (RFID) reader/tag, or any kind of similar near field communication technology. Such reader/tag technology may be simple and also cost-efficient to integrate into the arrangement and the user equipment. Moreover, such passive tags are nowadays more frequently integrated into smartphones and other mobile electronic devices.

Optionally, the reader module may be located at an outer surface of the vehicle, thereby allowing easy access to the module by the user. Still optionally, the reader module may be located in the proximity of the closeable space and/or the lockable lid, thereby further facilitating the experience for the user.

Optionally, any one of the authentication protocols may be any one of a Challenge-Response protocol, a Public Key Infrastructure (PKI), or any other type of authentication protocol. In its simplest configuration, and purely by way of example, the first authentication protocol may be that the passive tag provides one password, such as a number/digit combination, to the reader module, which then is verified by the arrangement for unlocking the lid. Challenge-Response protocols may be regarded as a family of protocols in which one party presents a question ("challenge") and another party must provide a valid answer ("response") to be authenticated. There are simple and more advanced protocols. Just as a matter of example, such protocols may include a time factor, wherein the question ("challenge") and expected answer ("response") varies over time, thereby making it more difficult to know the right answer, and consequently increasing the security. Still further, Challenge-Response protocols may use specific algorithms used for determining a fit between the question and the answer, thereby even further increasing the security. PKI may be defined as a set of roles, policies, and procedures needed to create, manage, distribute, use, store, and revoke digital certificates and manage public-key encryption. PKI is well-known and established technology. Still optionally, the additional authentication protocol may be a protocol which is more secure than the first authentication protocol.

Optionally, the first authentication protocol may be run as a single direction communication. In other words, the passive tag is providing and transmitting authenticity information to the reader and not vice versa. Still optionally, the additional authentication protocol may be run as bi-directional communication. In other words, the arrangement may be arranged to transmit information to the user equipment and the user equipment may be arranged to transmit information to the arrangement. Hence, a more secure authentication may be provided by the additional authentication protocol since it may use bi-directional communication.

According to a second aspect, the object is provided by a vehicle including an arrangement according to any one of the embodiments of the first aspect of the invention. The advantages of the second aspect are largely analogous the advantages of the first aspect of the invention and may therefore not be elaborated further here. It shall also be noted that all embodiments of the first aspect are applicable to all embodiments of the second aspect and vice versa, unless explicitly stated otherwise.

Optionally, the vehicle may be a passenger vehicle, such as a passenger car or a passenger road car. Still optionally, the vehicle may be propelled by an internal combustion engine, but it may also be a hybrid vehicle further including at least one electrical motor for propelling the vehicle. Still further, the vehicle may also be a pure electrical vehicle. In the event the vehicle includes at least one electrical motor, it may include at least one energy source, such as a battery, which may be rechargeable via a plug-in connection. A plug-in connection for recharging the vehicle battery may be accessible in a closeable space which also includes the charging device as disclosed herein. In an alternative embodiment, the vehicle may also be a commercial vehicle, such as a truck, lorry, bus or the like.

According to a third aspect, the object is provided by a method for unlocking a vehicle with a user equipment and an arrangement according to any one of the embodiments of the first aspect of the invention, wherein the method includes the following steps:

providing the user equipment in a range from the reader module such that the reader module and the passive tag of the user equipment are in communicative contact, running a first authentication protocol between the reader module and the passive tag for authenticating the passive tag, and when the passive tag is authenticated, unlocking the lockable lid, thereby accessing the closeable space, connecting the user equipment to the charging device in the closeable space for charging the user equipment, and running an additional authentication protocol between the arrangement and the user equipment for authenticating the user equipment to thereby unlock at least one door of the vehicle.

The advantages of the third aspect of the invention are analogous to the advantages as outlined in relation to the first and second aspects of the invention and may therefore not be elaborated further here. It shall also be noted that all embodiments of the third aspect of the invention are applicable to the embodiments of the first and second aspects of the invention and vice versa, unless explicitly expressed otherwise.

Optionally, the method may further include to run the additional authentication protocol when the user equipment has been charged by the charging device to a level allowing the user equipment to be activated. Thereby, devices in the user equipment, such as a processing unit, a memory unit or the like, may be activated, and the additional authentication protocol may be run by any one or a combination of these units. By this configuration, an increased safety during unlocking may be provided, reducing the risk of vehicle theft.

Optionally, the additional authentication protocol may be run via the charging device.

BRIEF DESCRIPTION OF DRAWINGS

Exemplifying and preferred embodiments of the present invention will now be described more in detail, with reference to the accompanying drawings, wherein.

Figure 1:
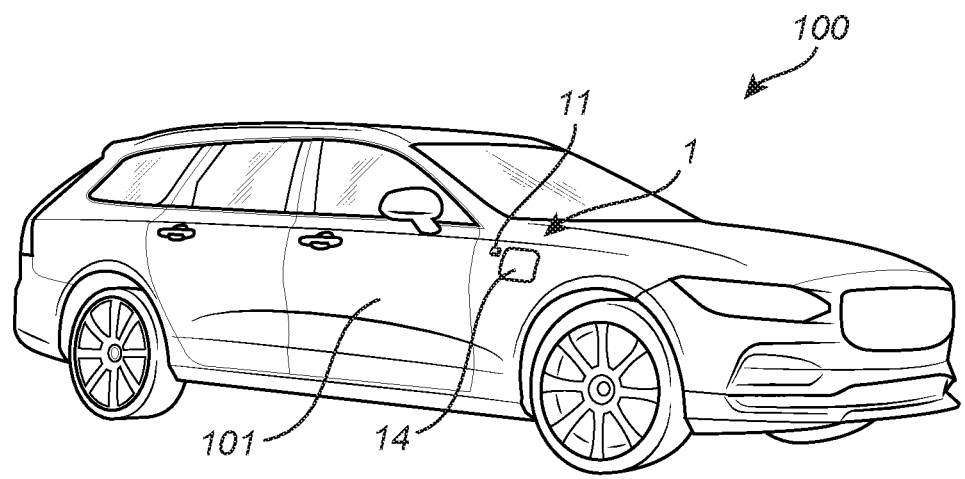
FIG. 1 shows a vehicle according to an example embodiment of the present invention.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DESCRIPTION OF EMBODIMENTS

In FIG. 1, a vehicle 100 including an arrangement 1 according to the first aspect of the invention is depicted. The vehicle 100 includes at least one door 101 for accessing a vehicle compartment for users of the vehicle 100. Still further, the vehicle 100 includes at least one lockable lid 14, which in this embodiment is a charging lid, but could also of course be a fueling lid or any other lid. Next to the lockable lid 14 is an electronic information reader module 11 positioned. As may be understood, the reader module 11 may be located at any location on the vehicle 100, but in a preferred embodiment the reader module 11 is positioned close to the lockable lid 14, or even on the lockable lid 14. The reader module 11 may further be identified by a user by a marking on the vehicle 100, which could be text, specific coloring etc. In an alternative embodiment, the reader module 11 may not be seen and also not possible to identify by visual inspection of the vehicle 100. This may increase the difficulty for an unwanted user to try to open the lid 14 by using the reader module 11.

Just as a matter of example, the reader module 11 of the arrangement 1 may also be used for other purposes, such as for easily opening the lid 14 when the user wants to refill the fueling tank (not shown) or charge the vehicle 100. As another example, the reader module 11 may also be used for automatically opening the lid 14 by a robot arm (not shown) including a passive tag, wherein the robot arm is used for automatically recharging the vehicle 100. In such a case, the authentication process between the robot arm and the vehicle 100 may include prior security data exchange, possibly over Bluetooth or WiFi.

Still further, the reader module 11 on the vehicle 100 may further be used for automatic payments, such as for toll roads/bridge passages or the like.

Figure 2:
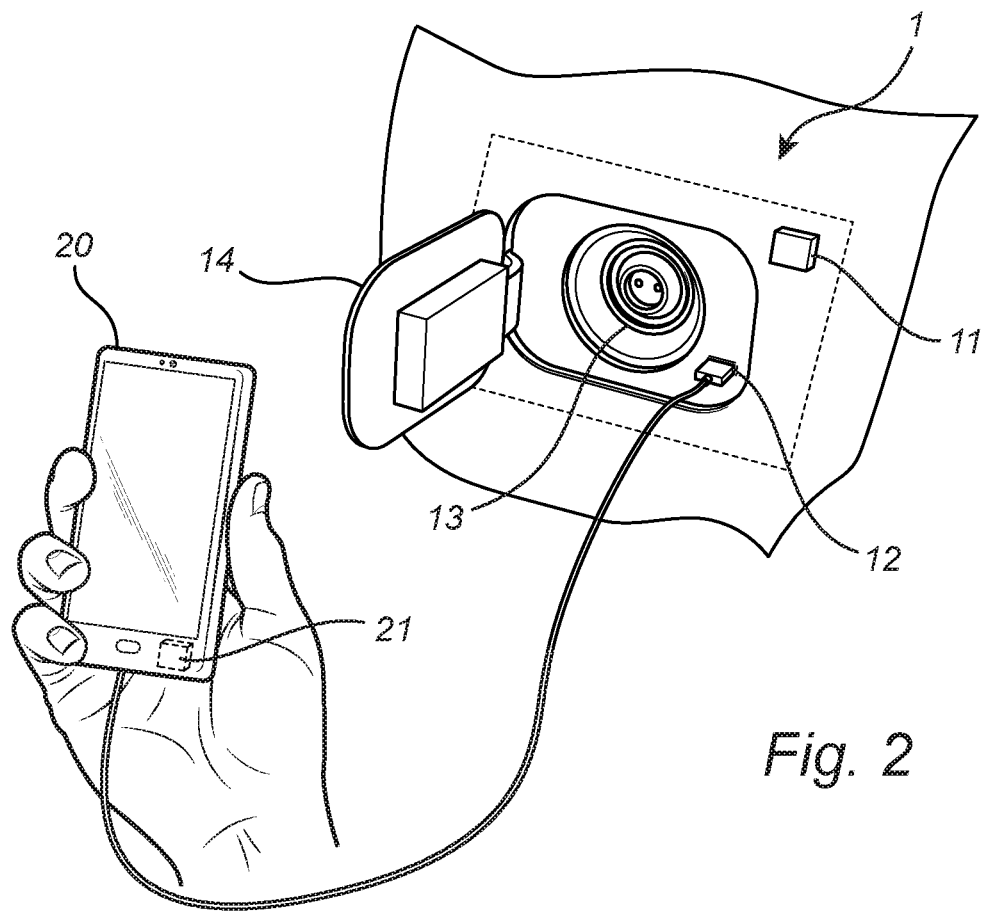
FIG. 2 shows an arrangement according to an example embodiment of the present invention.

Now turning to FIG. 2, a more detailed view of an arrangement 1 is depicted, which is connected to a user equipment 20 for unlocking a vehicle door 101 as seen in FIG. 1. The user equipment 20 is in this embodiment a smartphone which also includes a passive NFC tag 21. The arrangement 1 includes an electronic information reader module 11 for reading authenticity information from the passive tag 21 of the smartphone 20. The passive tag 21 is powered by electromagnetically inducing a voltage in the tag 21, the voltage being induced by the reader module 11. The arrangement 1 is configured for running a first authentication protocol via the reader module 11 and the passive tag 21 and further includes a charging device 12, in this embodiment a USB connection, for charging the user equipment 20. The charging device 12 is located in a closeable space 13 of the vehicle 100 which is closeable by at least one lockable lid 14. In this example embodiment, the lid 14 is a charging lid for accessing a socket for charging a battery (not shown) of the vehicle 100. The at least one lockable lid 14 is configured to be unlocked when the reader module 11 and the passive tag 21 are in communicative contact and when the arrangement 1 has run the first authentication protocol and verified an authenticity of the passive tag 21 based on the authenticity information in the tag 21. The arrangement 1 is configured to run an additional authentication protocol with the user equipment 20 for unlocking at least one door 101 of the vehicle 100, wherein in this example the additional authentication protocol is run via the USB connection 12. Hence, the lockable lid 14 may first be opened by the reader/tag, 11 and 21, even if the smartphone's 20 battery (not shown) is out of charge. After opening the lid 14 and the smartphone 20 has been connected to the USB connection 12 and charged to a level such that it can be activated again, the additional authentication protocol can be run via the connection 12. Thereby, a convenient and secure way of unlocking the vehicle 100 is provided.

The first authentication protocol may for example be a less secure protocol than the additional protocol run via the USB connection 12 which the smartphone 20 is connected to. Hence, the closeable space 13 may be easy accessible by using the tag 21 and the vehicle compartment may be more difficult to access since it requires the additional authentication protocol which may be a more secure protocol run by the respective processing units/memory units (not shown) in the smartphone 20 and the arrangement 1. For example, the additional protocol may include an algorithm and may be a so called Challenge-Response protocol.

Once the vehicle door 101 is opened, the user may disconnect the user equipment 20 from the charging device 12 and enter the vehicle 100. If the user equipment 20 has enough power, it may further be used for starting/activating the vehicle 100 by running another secure authentication protocol. In the case the user equipment 20 needs further charging, it may be connected to an additional charging device (not shown) inside the vehicle compartment. Thereafter, an authentication protocol for starting the vehicle 100 may be run, either directly via the additional charging device or wirelessly once the user equipment 20 has enough power. The additional charging device inside the vehicle compartment may be an additional USB connection, an inductive charging device or any other suitable charging device.

Figure 3:
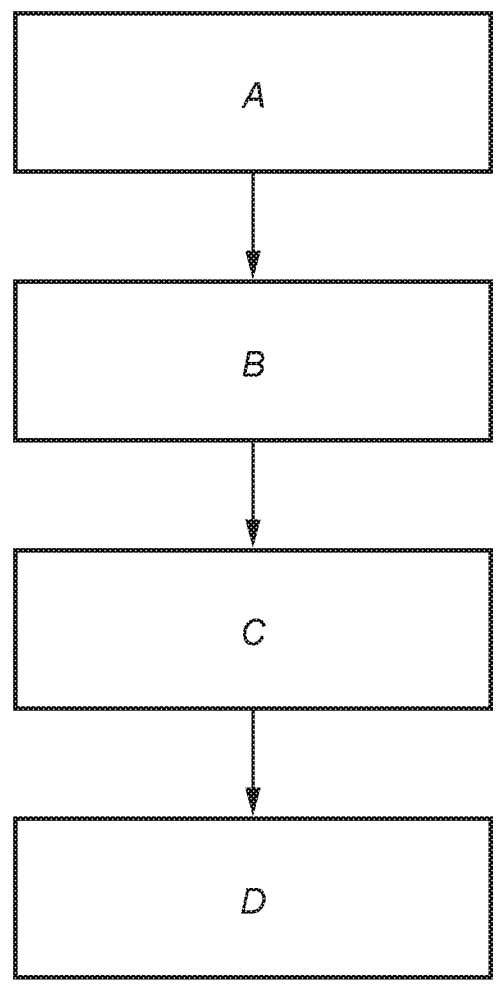
FIG. 3 shows flowchart of a method according to an example embodiment of the present invention.

In FIG. 3, a flowchart of a method according to an example embodiment of the present invention is depicted. The method is used for unlocking a vehicle 100 with a user equipment 20 and an arrangement 1 as disclosed herein. The method includes the following steps:

A) providing the user equipment 20 in a range from the reader module 11 such that the reader module 11 and the passive tag 21 of the user equipment 20 are in communicative contact, B) running a first authentication protocol between the reader module 11 and the passive tag 21 for authenticating the passive tag 21, and when the passive tag 21 is authenticated, unlocking the lockable lid 14, thereby accessing the closeable space 13, C) connecting the user equipment 20 to the charging device 12 in the closeable space 13 for charging the user equipment 20, and D) running an additional authentication protocol between the arrangement 1 and the user equipment 20 for authenticating the user equipment 20 to thereby unlock at least one door 101 of the vehicle 100.

The additional authentication protocol that is run in step D may be run when the user equipment 20 has been charged to a level allowing the user equipment 20 to be activated. In addition, as can be seen in the embodiment in FIG. 2, the additional authentication protocol in step D may advantageously be run via the charging device 12, which in this example is a USB connection. Alternatively and as also disclosed herein, the charging device 12 could also be another charging device, such as an inductive charging device. In such a case, the additional authentication protocol may be run via a wireless connection, such as WiFi or Bluetooth when the user equipment 20 has been charged to a level allowing it to be activated. Thereby a more secure authentication protocol may be run once the user equipment is activated, for example an authentication protocol as disclosed herein, or any other similar secure authentication protocol.

The invention is not limited to the embodiments described herein. It would be evident for the skilled person that other embodiments and modifications to the embodiments specified hereinabove are also possible within the scope of the claims.

The invention claimed is:

1. An arrangement for unlocking a vehicle with a user equipment, comprising,
   an electronic information reader module for reading authenticity information from a passive tag of the user equipment, said passive tag being powered by inducing a voltage therein, wherein the arrangement is configured for running a first authentication protocol via the reader module and the passive tag,
   a charging device for charging the user equipment, wherein the charging device is located in a closeable space of the vehicle being closeable by at least one lockable lid,
   wherein the at least one lockable lid is configured to be unlocked when the reader module and the passive tag are in communicative contact and when the arrangement has run the first authentication protocol and verified an authenticity of the passive tag based on the authenticity information, and
   wherein the arrangement is configured to run an additional authentication protocol with the user equipment for unlocking at least one door of the vehicle.

2. The arrangement according to claim 1, wherein the passive tag is powered by inducing a voltage therein by the electronic information reader module.

3. The arrangement according to claim 1, wherein the additional authentication protocol for unlocking the at least one door is configured to be run via the charging device.

4. The arrangement according to claim 1, wherein the charging device comprises at least one of a physical charging connection, a USB connection, or an inductive charging connection.

5. The arrangement according to claim 1, wherein the additional authentication protocol is configured to be run via at least one of a physical electrical connection and a wireless connection between the arrangement and the user equipment.

6. The arrangement according to claim 1, wherein the lockable lid is a fueling and/or electrical charging lid of the vehicle.

7. The arrangement according to claim 1, wherein the user equipment is any one of a mobile device, a smartphone and a tablet computer.

8. The arrangement according to claim 1, wherein the electronic information reader module and the passive tag are adapted to be in communicative contact in a range of 2 meters or less from each other.

9. The arrangement according to claim 1, wherein the electronic information reader module and the passive tag are configured as an NFC reader/tag and/or an RFID reader/tag.

10. The arrangement according to claim 1, wherein the electronic information reader module is located at an outer surface of the vehicle.

11. The arrangement according to claim 1, wherein the electronic information reader module is located in the proximity of the closeable space and/or the lockable lid.

12. A vehicle comprising the arrangement according to claim 1.

13. A method for unlocking a vehicle with a user equipment and an arrangement according to claim 1, wherein the method comprises the following steps:
   A) providing the user equipment in a range from the reader module such that the reader module and the passive tag of the user equipment are in communicative contact,
   B) running a first authentication protocol between the reader module and the passive tag for authenticating the passive tag, and when the passive tag is authenticated, unlocking the lockable lid, thereby accessing the closeable space,
   C) connecting the user equipment to the charging device in the closeable space for charging the user equipment, and
   D) running an additional authentication protocol between the arrangement and the user equipment for authenticating the user equipment to thereby unlock at least one door of the vehicle.

14. The method according to claim 13, further comprising:
   running the additional authentication protocol when the user equipment has been charged by the charging device to a level allowing the user equipment to be activated.

15. The method according to claim 13, wherein the additional authentication protocol is run via the charging device.

* * * * *